United States Patent [19]

Vehmas

[11] Patent Number: 5,254,152
[45] Date of Patent: Oct. 19, 1993

[54] COOLING STATION IN A TEMPERING PLANT FOR GLASS SHEETS

[75] Inventor: Jukka H. Vehmas, Tampere, Finland

[73] Assignee: Tamglass Engineering Oy, Finland

[21] Appl. No.: 961,019

[22] Filed: Oct. 14, 1992

Related U.S. Application Data

[63] Continuation of Ser. No. 761,498, Sep. 18, 1991, abandoned.

[30] Foreign Application Priority Data

Sep. 20, 1990 [FI] Finland .................................. 904626

[51] Int. Cl.$^5$ .............................................. C03B 27/04
[52] U.S. Cl. ........................................ 65/348; 65/349; 65/351; 65/374.12
[58] Field of Search .................... 65/114, 348, 349, 351, 65/374.12

[56] References Cited

U.S. PATENT DOCUMENTS

| | | | |
|---|---|---|---|
| 2,553,945 | 5/1951 | Schrader | 65/349 |
| 2,968,894 | 1/1961 | Hess . | |
| 3,293,022 | 12/1966 | Beattie | 65/348 X |
| 3,387,963 | 6/1968 | Tilton | 65/350 |
| 4,767,439 | 8/1988 | Reunamäki | 65/348 |
| 5,011,525 | 4/1991 | McMaster | 65/351 |
| 5,078,774 | 1/1992 | Vehmas et al. | 65/349 |

FOREIGN PATENT DOCUMENTS 2254530  7/1973  France .

OTHER PUBLICATIONS

A.P.C. Application of Aug. 4, 1941, Ser. No. 405,411, published Jun. 1943.

Primary Examiner—Robert L. Lindsay
Attorney, Agent, or Firm—Burns, Doane, Swecker & Mathis

[57] ABSTRACT

In a cooling station in a tempering plant for glass sheets for chilling, heat-strengthening, or after-cooling, the cooling station including upper and lower cooling-air blast nozzles are positioned above and below the glass sheets to be cooled. Nozzle covers cover the upper and lower nozzles. The nozzle covers are covered with perforated plates having a reflection coefficient for more than 0.8 for heat radiation. The plates are detachable from the nozzle covers and are thus replaceable.

17 Claims, 2 Drawing Sheets

COOLING STATION IN A TEMPERING PLANT FOR GLASS SHEETS

This application is a continuation of application Ser. No. 07/761,498, filed Sep. 18, 1991, abandoned.

The present invention relates to a cooling station in a tempering plant for glass sheets for quenching, heat-strengthening, or after-cooling, said cooling station including cooling-air blast nozzles above and below the glass sheets to be cooled. The construction of such a cooling station typically includes also horizontal rotatable conveyor rollers for carrying glass sheets between the upper and lower nozzles as well as reflection plates, so-called "false rollers", intended for air jets and set above the rollers.

The practical application of glass-tempering processes has generally been such that a quenching chiller is designed and manufactured in view of carrying out the cooling of glass as effectively as possible. The chiller and the blower are dimensioned in a manner that the chilling or quenching of thinnest desired glass is effected by using maximum cooling power. However, there are at least two application, wherein the above is not true:

bending+tempering of glass outside a furnace
heat-strengthening of thick glass (>8 mm) e.g. to the reading of 40N/mm$^{-2}$.

In these cases, the cooling rate of glass must still be further decelerated from the situation that the glass is only oscillated without actually cooling it at all.

When bending glass outside a furnace, particularly in the case of 3 mm glass, the glass cooling rate is so rapid that successful glass tempering is no longer possible. In order to achieve successful tempering, the glass temperature in the case of 3 mm glass should be in the order of 610° C. at the commencement of a chilling operation. If this is not the case, there is no way of obtaining sufficient compression stress in glass. On the other hand, the post-furnace exit temperature of glass can hardly be raised to above 630° C., since by this time the glass begins to develop too many optical faults, such as hot spots, caused by rollers and the like. For example, in an apparatus operating on the principle disclosed in the Applicant's EP Patent 0261611, the duration of a bending process is such that 3 mm glass has time to cool down below said 610° C. Thus, there are two real possibilities of development (assuming that bending cannot be accelerated from its present rate):

bringing supplementary heat in glass during or after a bending operation
decelerating the glass cooling rate during a bending operation Bringing supplementary heat in glass during a bending operations is problematic since, first of all, this requires that all materials of machine components included in a bender be selected in view of withstanding a higher temperature. However, all components are not capable of withstanding the heat and, thus, these components must be separately protected or located in a position not so favourable in terms of their function. Secondly, heat expansion leads to major problems especially in terms of dimensional requirements of glass. A third problem is that, e.g. a bender disclosed in EP Patent 0261611 simply has no facilities for accommodating heating equipment, since heating must be controlled, it must equal on either side of glass and uniform in planar sense, i.e. heating must be effected close to the glass. In addition, bringing in supplementary heat can easily lead to a safety hazard if heating is effected e.g. by means of hot-gas blasting.

If heating is effected after a bending operation, the problem will be especially dimensional tolerances: glass is not dimensionally stable during a heating operation since in our own above-cited apparatus it is not possible to support the glass after a bending block. Another problem is that a lot of heating capacity is required for carrying out the heating within a reasonable time period.

The heat-strengthening of thick glass involves similar problems: the cooling rate of glass having a thickness of over 8 mm is too rapid in case it is just brought to room temperature instead of actually cooling it. This produces in glass a compression stress exceeding 40N/mm$^2$ (=internal standard in one Japanese corporation). Thus, the glass cooling rate must be decelerated.

The cooling rate of glass can be decelerated according to what is disclosed in Finnish Patent application No. 903362, wherein the heat-strengthening of glass is carried out in a space having a temperature above room temperature and temperature of the space is controlled by the application of indirect cooling. A problem here is not only the price of facilities but also the flexible application thereof to tempering production since, naturally, the strengthening space is not as such suitable to tempering but the cooling plates must always be first disassembled. The estimated time for disassembly is one day.

The following explains in more detail the fundamentals of glass cooling. According to experiences and measurements, the cooling rate of 3 mm glass at 600° C. in a room-temperature chiller is roughly 5.5° ... 6° C./s, the emission rate of heat from glass being:

$$\phi = \frac{m \cdot c \cdot \Delta T}{t} = 56 \text{ kW/m}^2$$

wherein
m=mass of glass
c=specific heat of glass
$\Delta T$=glass cooling rate per time slice (°C.)
t=time slice Assuming that glass delivers heat at a uniform rate upwards and downwards, each surface delivers heat at a rate of approximately 28 kW/m$^2$.

Heat is delivered away through emission, natural convection, and conduction to rollers.

Emission

The surface delivers emission upwards:

$$q^+ = \epsilon \cdot \sigma \cdot T^4 = 32 \text{ kW/m}^2$$

wherein
$\epsilon$=emissivity of glass
$\sigma$=Stefan-Boltzmann constant=$5.6693 \cdot 10^{-8}$ W/m$^2$.K$^4$
T=temperature of glass The surfaces adjacent to glass reflect back some of the heat radiation emitted by glass as well as emit heat radiation to glass according to their own temperature and emissivity:

$$q^- = q^-\text{ref} + q^-\infty$$

$$q^-\text{ref} = F \cdot (1-a) \cdot q^+$$

wherein

F = coefficient of visibility, or a coefficient which determines how much of the radiation is returned by a total mirror surface to glass instead of elsewhere in environment; in chiller F=0.55 a = absorption coefficient $\approx \epsilon$

For example, radiation is reflected back to glass by oxidized aluminium surfaces as follows $$q^{-}ref = 0.55 \, (1-0.4) \cdot 32 \approx 10.6 \text{ kW/m}^2$$

In addition, the surfaces emit radiation appr. 0.2 kW/m². Thus, the share of natural convection will be appr. 7 kW/m².

The total heat flow downwards from glass is difficult to determine since conduction to rollers is difficult to determine. It can probably be assumed, however, that radiation downwards is nearly in the same order as upwards, but conduction to rollers compensates for part of the natural convection.

An object of the invention is to provide a cooling station in a tempering plant for glass sheets, wherein the cooling rate of glass can be decelerated as compared to the cooling rate of glass at normal room temperature without blast cooling. A particular object of the invention is to provide a cooling station, which without structural modifications is applicable both to effective blast chilling and to deceleration of the cooling rate of a glass sheet.

In order to achieve these objects, the invention is based on a conception that the surfaces adjacent to glass and having a poor reflectance of heat radiation are replaced by surfaces with a high reflectance of heat radiation. Such surfaces include e.g. nozzle covers, surfaces of air-jet deflection plates (false rollers), and exposed metal surfaces of conveyor rollers.

The characterizing features of the invention are set forth in the annexed claims.

Furthermore, it is beneficial that said surfaces highly reflective to heat radiation be insulated from the body for preventing the conduction of heat to massive metal components. Thus, the temperature of surfaces closest to glass increases as compared to the situation without a heat insulation. A result of this is not only more heat radiation being emitted by the surfaces to glass but also less convection from glass to ambient air.

BRIEF DESCRIPTION OF THE DRAWINGS

The invention is depicted in the accompanying drawings, wherein FIG. 1 provides a perspective view of a vertical section of a cooling station over a short portion of the length of a cooling station and in which.

Figure 1:
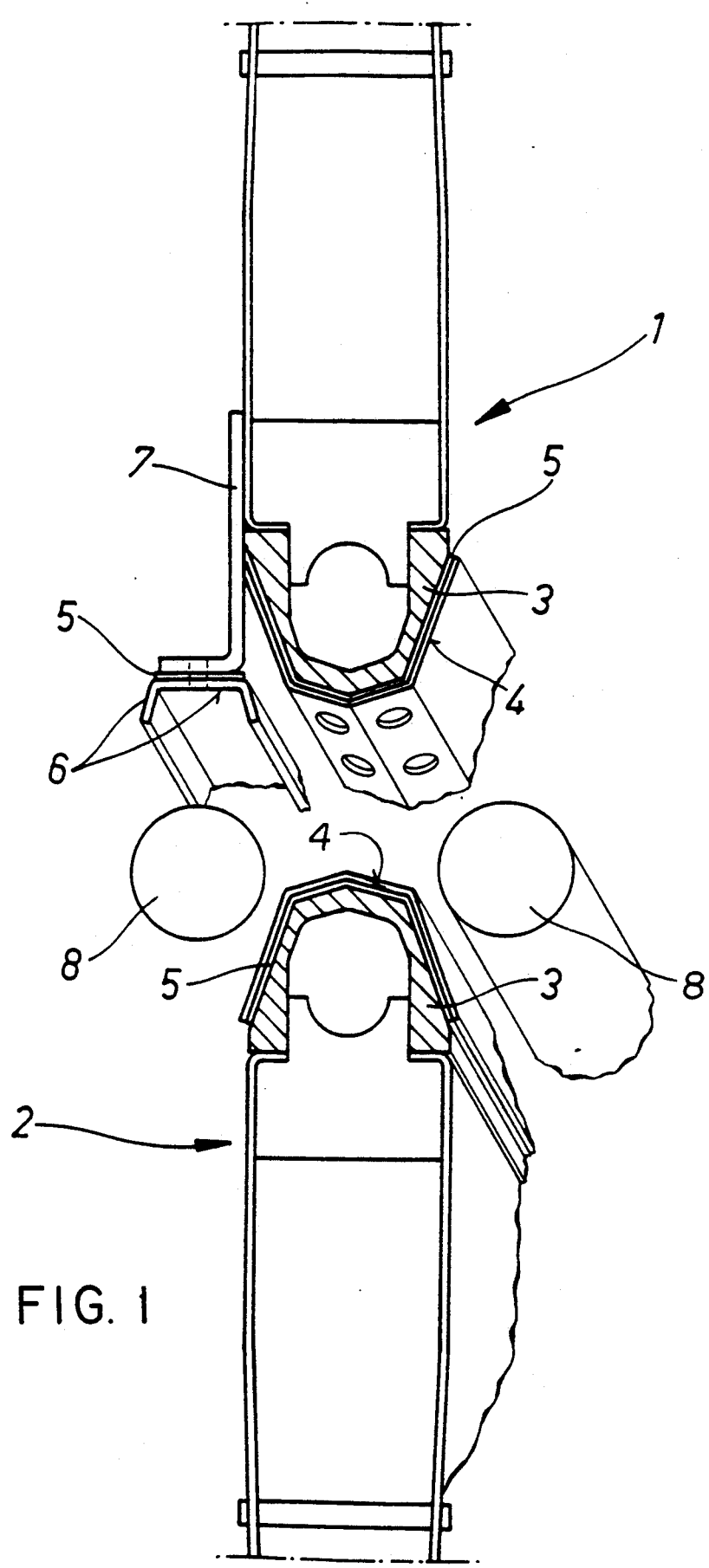
Figure 2:
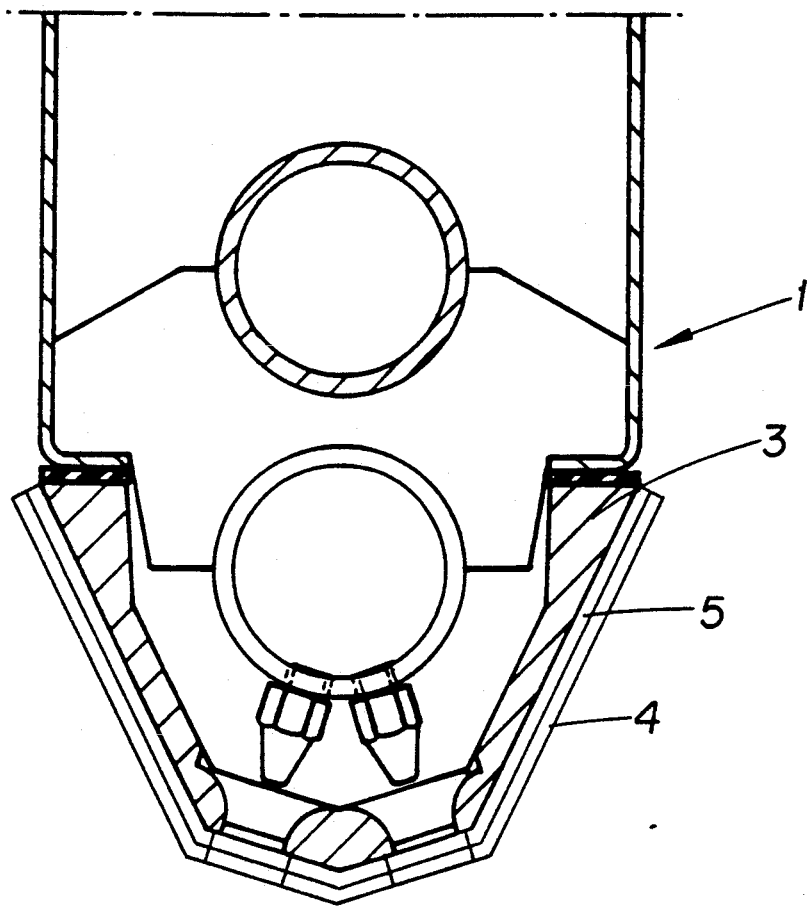
FIG. 2 shows a cross-sectional view of a nozzle of FIG. 1.

As for the cooling-air blast nozzles, the figure illustrates an upper nozzle beam 1 and a lower nozzle beam 2, the mutually facing surfaces thereof being provided with orifices for blasting cooling air to the opposite sides of a glass sheet. The glass sheet is carried by means of horizontal rotatable rollers 8 between nozzles 1 and 2. The upper nozzle beam 1 is further fitted through the intermediary of a fastening plate 7 with air-jet deflection plates or so-called false rollers 6 for deflecting the air jets directed upwards from the glass surface back to the glass surface. These structures are prior known and in general use.

The invention is embodied in a manner that on top of the present nozzle covers 3 are mounted thin (0.5-1 mm) perforated plates 4, matching the shape of the nozzle covers and having a high reflectance of heat radiation ($\epsilon$ is low). At the nozzle orifices, said reflection plates 4 are naturally perforated in a manner that the diameter of perforations in plates 4 is a few millimeters larger to prevent plates 4 from interfering with tempering-air jets. Plates 4 are insulated from nozzle covers 3 by means of a thin (1-2 mm) fabric 5 (e.g. Kevlar fabric) placed therebetween. Likewise, said air-jet deflection plates (false rollers) 6 are also insulated from fastening plates 7 by means of a thin heat-insulation layer 5 (e.g. Kevlar fabric).

In order to achieve the objects of the invention, said plates 4 and 6 must be made of such a material and/or must be surface-treated in a manner that the surfaces of plates 4 and 6 will have a reflection coefficient of more than 0.8 for heat radiation. This sets special requirements for materials used and/or their surface treatment methods, since the temperature of plates 4 and 6 may momentarily rise up to 200° C. and, in addition, the reflector will be momentarily subjected to the effects of $SO_2$ (although in very low concentrations). Even though the polished surfaces of e.g. aluminium, copper and brass are highly reflective to heat radiation (substantially over coefficient 0.8), these materials are poorly adaptable to carrying out the invention since, in operating conditions, such surfaces only remain bright for a certain period of time and oxidize quite rapidly to a grey mat surface.

On the other hand, satisfactory results have been achieved by means of a test apparatus with reflective surfaces 4 and 6 made of stainless steel AISI 304 2 BA (the latter part of designation refers to bright anneal of the material). The polished surface of stainless steel has an emission coefficient of 0.07 (as a clean sheet without polishing only about 0.5).

In order that a reflective surface could retain a high reflectance or a low emissivity for as long as possible, the reflective surface should preferably contain one or more of the following materials (or should be made of these materials): chromium, chromium-alloyed stainless steel, platinum, titanium and/or gold. These materials are highly resistant to corrosion and oxidation in the above-discussed conditions. Special attention must be paid not only to the selection of material but also to the brightening of its surface. For example, the chromium plating must be effected as so-called hard chrome plating, preferably on top of stainless steel. Bright chrome plating is not as well adaptable in these particular conditions, since a nickel coating is employed beneath the chromium and nickel patinizes especially in a sulphur-containing environment.

However, the material selected for a coating can be allowed to undergo some staining occurring during the course of a reasonably long time, since the reflective surfaces of the invention can be readily replaced by new surfaces and at low material costs. For example, the entire nozzle covers 3 are not preferably made of a reflective material since, in that case, all of those covers would have to be replaced, whenever necessary.

This would take both time and costs. Instead, a thin, separate reflection plate surface 4 can be replaced quickly and at low material costs. The reflection plate surface 4 can be attached to heat-insulation fabric 5 e.g. by means of an adhesive. The easy replacement and low material consumption of reflection surfaces 4 is a substantial benefit since, in industrial environment, nearly all economical, low-emissivity materials are gradually oxidized and, thus, lose their reflecting power.

The significance of insulating fabric 5 is negligible e.g. in the case involving a bender as shown in EP Patent publication 0261611, wherein the bending only takes a short time (about 4-6 seconds). However, the significance of insulating fabric 5 is emphasized in a case involving heat-strengthening, wherein e.g. 12 mm glass remains in a heat-strengthening chiller in the order of 5-6 minutes.

The conducted tests and measurements have confirmed that the cooling rate of glass can be decelerated by about 30% by means of the invention. This coincides quite well also with conducted theoretical calculations.

The invention has been capable of substantially expanding the range of application for a cooling station. For example, a bending and tempering apparatus as disclosed in EP Patent No. 0261611 can be used for tempering even 2.9 mm glass, instead of earlier 3.2 mm glass, to ECE R 43 standards (vehicle standard), while blasting power remains the same. In heat-strengthening, it is possible to strengthen 12 mm (even 13 mm) glass to a compression stress of $40N/mm^2$. In the prior art, with reflection surfaces comprising grey, oxidized aluminium, it has only been possible to heat-strengthen the 8 mm and thinner glass to the above compression stress.

I claim:

1. A cooling station in a tempering plant for glass sheets for chilling, heat-strengthening, or after-cooling, comprising upper and lower cooling-air blast nozzles above and below the glass sheets to be cooled and nozzle covers covering said upper and lower nozzles, the nozzle covers of said upper and lower nozzles being covered with perforated plates having a reflection coefficient of more than 0.8 for heat radiation, and wherein said plates are detachable from said nozzle covers and are thus replaceable.

2. A cooling station as set forth in claim 1, further comprising horizontal rotatable conveyor rollers for carrying glass sheets between upper and lower nozzles and air-jet deflection plates mounted above said rollers wherein surfaces of said deflection plates and said rollers have a reflection coefficient of more than 0.8 for heat radiation.

3. A cooling station as set forth in claim 1, wherein said plates are insulated from said nozzle covers by an insulation layer.

4. A cooling station as set forth in claim 1, wherein said plates are made of stainless steel, having a brightened surface.

5. A cooling station as set forth in claim 4, wherein said plates are brightened by bright annealing.

6. A cooling station as set forth in claim 1, wherein said plates contain at least one of the following materials: chromium, chromium-alloyed stainless steel, platinum, titanium, gold.

7. A cooling station as set forth in claim 6, wherein said plates include hard chrome plating on top of stainless steel.

8. A cooling station as set forth in claim 6, wherein a surface of a basic material lying beneath a coating layer making up said plates is reflective.

9. A cooling station in a tempering plant for glass sheets for chilling, heat-strengthening, or after-cooling, said cooling station including upper and lower cooling-air blast nozzles above and below the glass sheets to be cooled and nozzle covers covering said upper and lower nozzles, the nozzle covers of said upper and lower nozzles being covered with perforated plates having a reflection coefficient of more than 0.8, wherein said plates are detachable from said nozzles and are thus replaceable, wherein said plates are insulated from said nozzle covers by an insulation layer, and wherein said insulation layer and said plates are provided with holes, the holes being in alignment with orifices of said nozzle covers and further being substantially larger than the nozzle cover orifices.

10. A cooling station as set forth in claim 1, wherein a bending station is linked with a cooling station, said bending station being provided with reflective surfaces which decelerate the cooling rate of glass during a bending operation.

11. A cooling station as set forth in claim 7, wherein a surface of a basic material lying beneath a coating layer making up said plates is reflective.

12. A cooling station as set forth in claim 3, wherein said insulation layer is secured to said perforated plates.

13. A cooling station as set forth in claim 3, wherein said insulation layer is secured to said nozzle covers.

14. A cooling station as set forth in claim 3, wherein said insulation layer is secured to at least one of said perforated plates and said nozzle covers by an adhesive.

15. A cooling station as set forth in claim 9, wherein said insulation layer is secured to said perforated plates.

16. A cooling station as set forth in claim 9, wherein said insulation layer is secured to said nozzle covers.

17. A cooling station as set forth in claim 9, wherein said insulation layer is secured to at least one of said perforated plates and said nozzle covers by an adhesive.

* * * * *